(12) United States Patent
Lee

(10) Patent No.: US 6,711,011 B2
(45) Date of Patent: Mar. 23, 2004

(54) COMPUTER HARDWARE STRUCTURE

(75) Inventor: Myoung-ku Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 10/125,497

(22) Filed: Apr. 19, 2002

(65) Prior Publication Data

US 2003/0075994 A1 Apr. 24, 2003

(30) Foreign Application Priority Data

Oct. 19, 2001 (KR) ......................... 2001-64584

(51) Int. Cl.[7] ................................................ G06F 1/16
(52) U.S. Cl. ...................... 361/685; 361/683; 361/686; 248/694; 312/223.2
(58) Field of Search ................. 361/683, 684, 361/685, 686, 724–727, 740, 759; 364/708.1; 248/27.1, 694, 299.1, 317, 551–553, 609–638; 312/223.2, 307, 223.3, 263, 216, 218; 292/42, 148, 151, 307 R; 360/97.01, 137; 211/26, 41

(56) References Cited

U.S. PATENT DOCUMENTS

| | | | | | |
|---|---|---|---|---|---|
| 5,447,367 A | * | 9/1995 | Wei | ......................... | 312/223.2 |
| 5,995,364 A | * | 11/1999 | McAnally et al. | .......... | 361/685 |
| 6,297,954 B1 | * | 10/2001 | Seo | .............. | 361/686 |
| 6,313,983 B1 | * | 11/2001 | Liu et al. | ................. | 361/683 |
| 6,386,656 B1 | * | 5/2002 | Chen | ....................... | 312/223.2 |
| 6,437,977 B1 | * | 8/2002 | Yu | .............................. | 361/685 |
| 6,530,551 B2 | * | 3/2003 | Gan | .............................. | 248/694 |
| 6,538,879 B2 | * | 3/2003 | Jiang | ......................... | 361/683 |
| 6,580,606 B1 | * | 6/2003 | Leman | ....................... | 361/685 |

* cited by examiner

Primary Examiner—Michael Datskovsky
(74) Attorney, Agent, or Firm—Staas & Halsey LLP

(57) ABSTRACT

A computer having a main casing, a first bracket mounted on the main casing and accommodating a first peripheral device, and a second bracket removably combined to the first bracket and accommodating a second peripheral device. With this configuration, the computer has a computer casing which is compact without blocking hardware components with respect to each other.

26 Claims, 12 Drawing Sheets

COMPUTER HARDWARE STRUCTURE

CROSS-REFERENCE TO RELATED APPLICATIONS

This application claims the benefit of Korean Patent Application No. 2001-64584 filed on Oct. 19, 2001, in the Korean Industrial Property Office, the disclosure of which is incorporated herein by reference.

BACKGROUND OF THE INVENTION

1. Field of the Invention

The present invention relates in general to a computer, and more particularly, to a computer having an improved structure with a first bracket and a second bracket.

2. Description of the Related Art

A computer system comprises a computer, a monitor to display a picture, and an input unit to input a predetermined signal.

Referring to FIG. 12, a computer 301 includes a computer casing 310 in which first and second brackets 330 and 340 are provided as one body. Typically, on the first bracket 330 is mounted a peripheral device 335 such as a CD-ROM drive, a DVD (digital versatile disk) drive, etc., and on the second bracket 340 is mounted an auxiliary memory 345 such as an HDD (hard disk drive), an FDD (floppy disk drive), etc. On one side wall of the computer casing 310 is installed a main board 320 mounted with a CPU (central processing unit), a RAM (random access memory), etc.

With this configuration, to assemble the computer 301, the main board 320 is fixed on one side wall of the computer casing 310, and then the peripheral device 335 and the auxiliary memory 345 are inserted within the first and second brackets 330 and 340, and are fastened with bolts 332 and 342, respectively. Thereafter, the peripheral device 335 and the auxiliary memory 345 are connected to the main board 320 with a connector (not shown), so that the assembly of the computer 301 is completed.

However, in the conventional computer, it is difficult to separate the main board from the computer casing in order to repair or change the main board because the second bracket and the auxiliary memory accommodated therein block the separation of the main board. More particularly, not only for the reason that the second bracket cannot be separated from the first bracket, but also because the auxiliary memory accommodated in the second bracket projects over the second bracket, the second bracket and the auxiliary memory block the movement of the main board, thereby obstructing the separation or installation of the main board.

To solve this problem, the size of the computer casing is required to be enlarged, but this results in the inability to provide a compact computer.

SUMMARY OF THE INVENTION

Accordingly, it is an object of the present invention to provide a computer having a compact computer casing without interference between hardware components.

Additional objects and advantages of the invention will be set forth in part in the description which follows and, in part, will be obvious from the description, or may be learned by practice of the invention.

The foregoing and other objects of the present invention may be accomplished by providing a computer comprising: a main casing; a first bracket mounted on the main casing and accommodating a first peripheral device; and a second bracket removably connected to the first bracket and accommodating a second peripheral device.

The first bracket may be fixedly mounted on the main casing. In an alternative embodiment of the present invention, the first bracket may be removably mounted on the main casing. At least one of the first bracket and the second bracket is provided with at least one guiding projection protruding therefrom, and the other one of the first bracket and the second bracket is provided with at least one guiding groove to slidingly accommodate the guiding projection.

In another embodiment of the present invention, the guiding projection is formed of a pair of guiding projections spaced from each other by a predetermined distance and provided on the lower plate of the first bracket, and the guiding groove is provided on the upper plate of the second bracket and accommodates the pair of guiding projections.

Further, the guiding groove comprises: a first groove parallel with a line that links two guiding projections so as to accommodate the pair of guiding projections; and second grooves extending from the first groove and guiding a front side of the second peripheral device to be exposed, the second grooves forming a pair of grooves spaced from each other by a distance corresponding to the distance between the guiding projections and are substantially perpendicular to the first groove.

In another embodiment of the present invention, the computer further comprises a removal protector preventing the second bracket from being voluntarily removed from the first bracket. In this embodiment, the removal protector comprises: hook holders respectively formed on opposite side plates of the second bracket; and hooks respectively formed on opposite sides of the first bracket so as to be hooked to the hook holders. Further, the computer casing comprises a hook releaser to release the hooks from the hooking holders.

In this embodiment, the hook releaser comprises: a pair of ribs extending from both edges of the front end of the first bracket; an accommodating part formed at each rib; a bar stem supporting the hooks and movably connected to the accommodating part; and a spring disposed between the bar stem and the ribs and elastically restoring the bar stem to a hooking position such that the hooks are hooked to the hooking holder. In this embodiment, at both ends of the bar stem are provided a pair of coupling parts, respectively, which are slimmer than the bar stem so as to be inserted in the accommodating part of the rib.

Here, the computer casing further comprises a bar head provided at one end of the bar stem to prevent the spring from coming off the bar stem. Further, the computer casing comprises a stopper provided at the other end of the bar stem to prevent the bar stem from coming off the insertion part of the rib.

In this embodiment, the at least one guiding projection comprises: a first guiding projection provided on the lower plate of the first bracket; and a second guiding projection spaced from the first guiding projection and protruding from the lower plate of the first bracket; and the at least one guiding groove comprises: a first guiding groove provided on the second bracket and connected with the first guiding projection; and a second guiding groove provided on the second bracket and accommodating a second guiding projection.

In an alternative embodiment of the present invention, the at least one guiding projection comprises: a first guiding projection provided on the upper plate of the second bracket; and a second guiding projection spaced apart from the first guiding projection and protruding from the upper plate of the second bracket; and the at least one guiding groove comprises: a first guiding groove provided on the first bracket and connected with the first guiding projection; and a second guiding groove provided on the first bracket and accommodating a second guiding projection.

In another embodiment of the present invention, the second guiding groove partially has an arc shape. As stated previously, the second guiding groove can be located on either the first bracket or the second bracket as two alternative embodiments. Here, at least one of the first bracket and the second bracket is provided with a hooking rib and the other one thereof is provided with a rib groove, and the hooking rib and the rib groove are removably connected to each other. Additionally, the first bracket or the second bracket is provided with a rotation stopper limiting rotation of the second bracket by a predetermined angle. The rotation stopper enables the first and second brackets to be connected to each other with a screw so as to reinforce the combination thereof with the screw.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
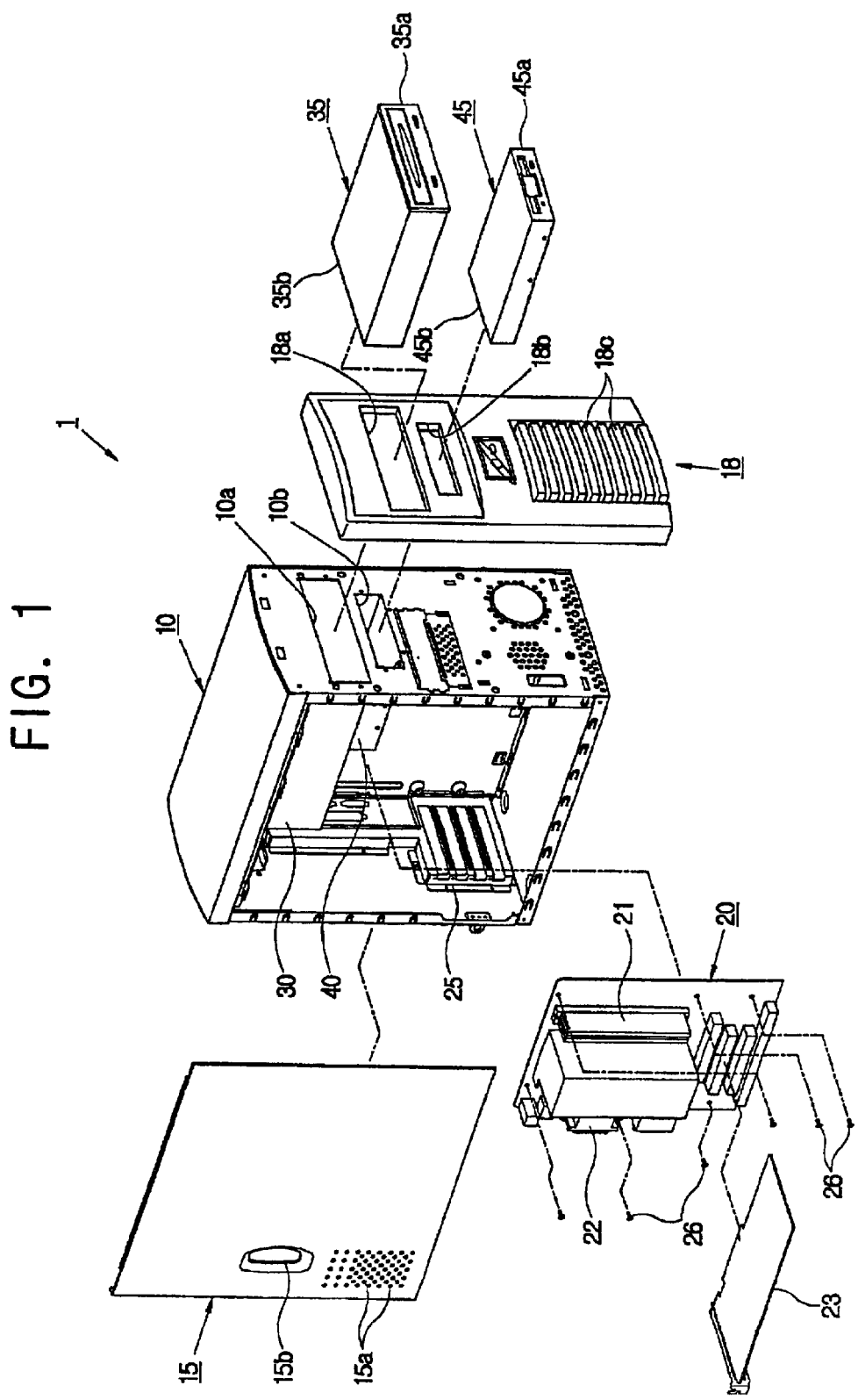
FIG. 1 is an exploded perspective view of a computer according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a computer system having a computer 1, a monitor (not shown) to display an image, and an input unit (not shown) such as a mouse or a keyboard to input a predetermined signal. Hereinafter, a peripheral device 35 includes a CD-ROM drive, a DVD drive, etc., and an auxiliary memory 45 includes an HDD, an FDD, etc.

As illustrated in FIG. 1, the computer 1 comprises a main casing 10, a side casing 15 removably connected to one side wall of the main casing 10, and a front casing 18 connected to the front of the main casing 10.

On the side casing 15 is provided a plurality of air holes 15a to emit heat generated from hardware components provided in the main casing 10. Above the air holes 15a is provided a handgrip 15b to attach and remove the side casing 15 to and from the main casing 10.

On the lower part of the front casing 18 is provided a plurality of air slots 18c into which outside air is provided. At the upper part of the front casing 18 is provided a plurality of slots 18a and 18b through which a front side 35a of the peripheral device 35 and a front side 45a of the auxiliary memory 45 are exposed, respectively. The plurality of slots 18a and 18b are positioned to correspond to a plurality of through holes 10a and 10b provided on the front of the main casing 10.

On one side wall of the main casing 10 is installed a main board 20 with a bolt 26. On the main board 20 are mounted a RAM 21, a CPU 22, and various cards 23. The cards 23 are supported by a plurality of card supporters 25 provided at the rear of the main casing 10.

In an upper area of the main casing 10 is provided a first bracket 30 to accommodate the peripheral device 35. Preferably, the first bracket 30 is incorporated with the main casing 10. Under the first bracket 30 is disposed a second bracket 40. The second bracket 40 is slidably connected to the first bracket 30 by a sliding part 50 (to be described later while referring to FIG. 5).

Figure 2:
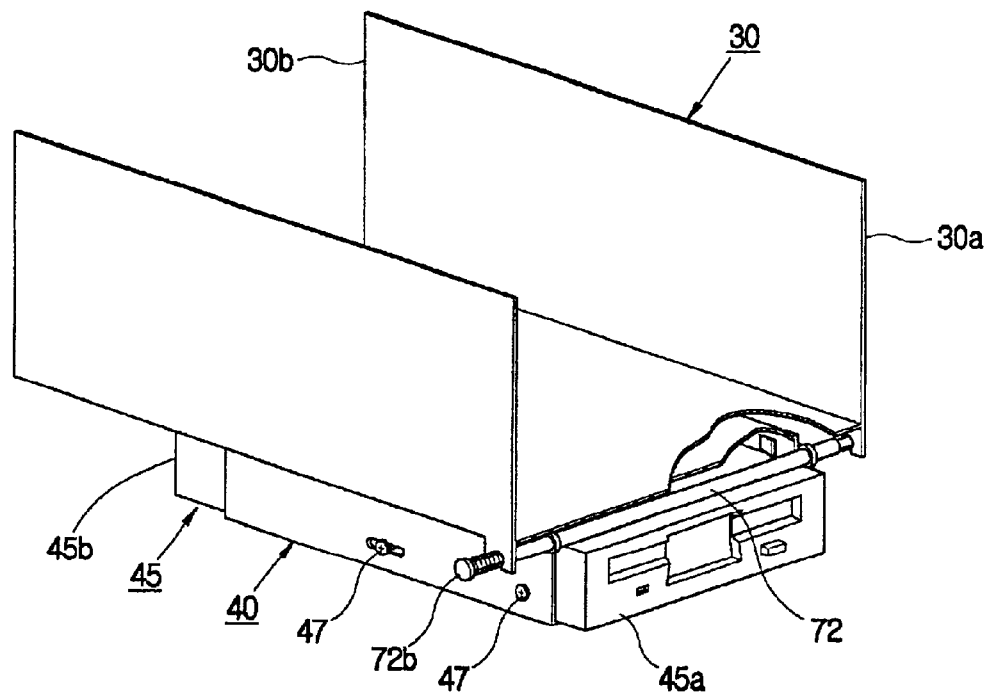
FIG. 2 is a perspective view of a combination of first and second brackets and an auxiliary memory provided in FIG. 1.
Figure 3:
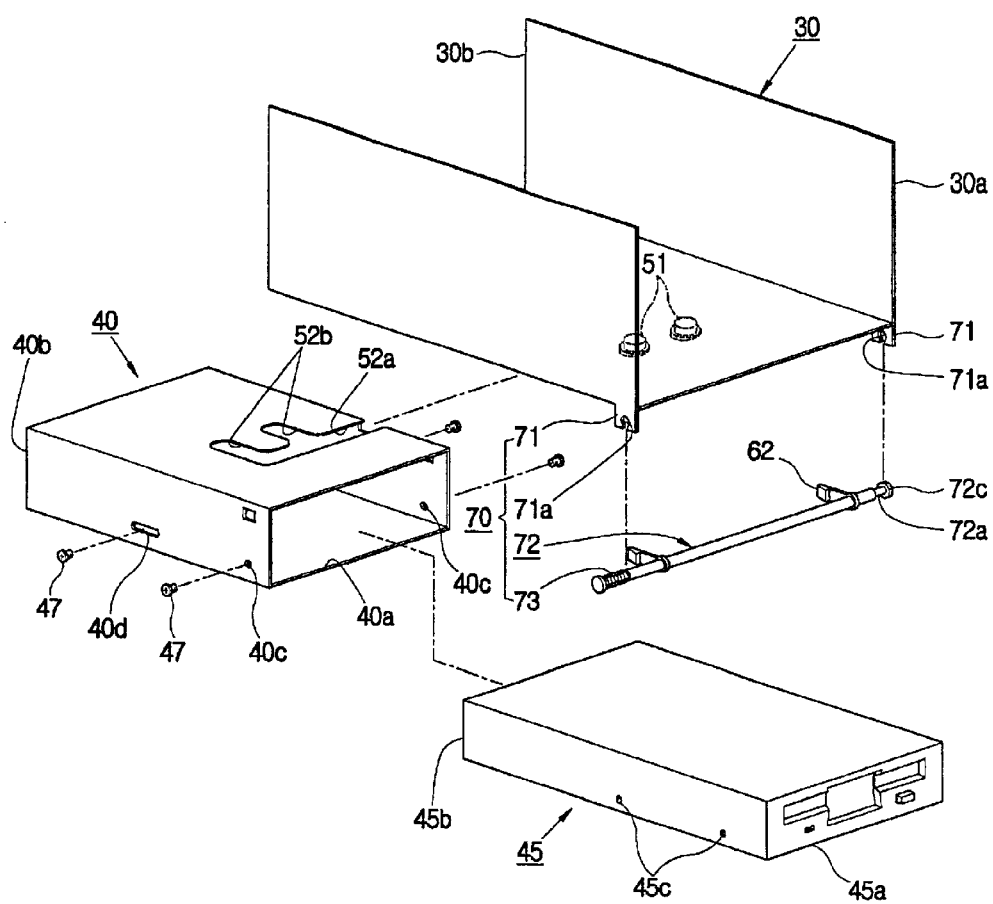
FIG. 3 is an exploded perspective view of the first and second brackets and the auxiliary memory provided in FIG. 2.

As illustrated in FIGS. 2 and 3, the first bracket 30 is made of steel and has a rectangular box shape. An outside end 30a and an inside end 30b thereof are disposed at front and middle upper areas of the main casing 10, respectively. In the first bracket 30 is selectively accommodated the peripheral device 35 such as a CD-ROM, a DVD, etc. At this time, the front side 35a of the peripheral device 35 is exposed through the slot 18a provided on the front casing 18 (see FIG. 1).

The second bracket 40 is made of steel and has a rectangular box shape like the first bracket 30, but the outside and inside ends 40a and 40b, respectively, are opened. In the second bracket 40 is accommodated the auxiliary memory 45 such as an HDD, an FDD, etc. On side plates of the second bracket 40 are provided a plurality of holes 40c and 40d through which bolts 47 are screw-coupled into screw holes 45c formed on the auxiliary memory 45. At least one of the holes is of an elongated shape (40d) to provide a convenient connection.

The second bracket 40 is manufactured separately from the first bracket 30, and slidably connected to the lower plate of the first bracket 30. For the sake of providing a sliding connection, the present embodiment has a sliding part 50 (see FIG. 5).

The sliding part 50 includes a pair of guiding projections 51 protruding from the lower plate of the first bracket 30 at a predetermined interval, and guiding grooves 52a and 52b formed on the upper plate of the second bracket 40 and accommodating the guiding projections 51. Here, the guiding projections 51 may comprise rivets or bolts connected to the lower plate of the first bracket 30, or may be integrally formed on the first bracket 30.

The guiding grooves 52a and 52b comprise the first guiding groove 52a, parallel with a line that links two guiding projections 51 so as to accommodate them, and the pair of second guiding grooves 52b transversely extending from the first guiding groove 51a and guiding the front side 45a of the auxiliary memory 45 toward the slot 18b of the front casing 18. The second grooves 52b are substantially perpendicular to the first groove 52a and are spaced from each other by a distance corresponding to the interval between the guiding projections 51.

Thus, to combine the second bracket 40 with the first bracket 30, first, the pair of guiding projections 51 provided on the lower plate of the first bracket 30 are inserted into the first guiding groove 52a of the second bracket 30 in which the auxiliary memory 45 is accommodated. Then, the second bracket 40 is slidingly moved against the first bracket 30 so as to make the front side 45a of the auxiliary memory 45 accommodated in the second bracket 40 reach the slot 18b of the front casing 18. Accordingly, the guiding projections 51 are moved from the first guiding groove 52a to the second guiding grooves 52b so that the second bracket 40 is connected to the lower plate of the first bracket 30.

At this time, because of the above sliding movement, it is difficult to firmly install the second bracket 40 on the lower plate of the first bracket 30. Thus, the present embodiment further provides a removal protector 60 (see FIG. 5) to prevent the second bracket 40 from being voluntarily removed from the first bracket 30.

The removal protector 60 comprises hook holders 61 respectively formed on opposite side plates of the second bracket 40, and hooks 62 respectively provided on opposite sides of the first bracket 30 so as to be hooked on the hook holders 61. Thus, when the pair of guiding projections 51 provided on the first bracket 30 are moved to the ends of the second grooves 52b by the sliding movement of the second bracket 40, the hooks 62 formed on the first bracket 30 are hooked to the hook holders 61 formed on the second bracket 40, thereby preventing the second bracket 40 from being voluntarily removed from the first bracket 30.

Further, the present embodiment provides a hook releaser 70 (see FIG. 3) to release the hooking state, thereby helping the second bracket 40 to be easily released from the first bracket 30 when desired.

The hook releaser 70 comprises a pair of ribs 71 extending from both lower edges of the front end 30a of the first bracket 30, an accommodating part 71a formed at each rib 71, a bar stem 72 supporting the hooks 62 and movably connected to the accommodating part 71a, and a spring 73 disposed between the bar stem 72 and one rib 71 and elastically restoring the bar stem 72 to a hooking position such that the hooks 62 are hooked on the hooking holders 61.

The accommodating part 71a is formed by cutting off a part of each rib 71. At both ends of the bar stem 72 are provided a pair of coupling parts 72a (see FIG. 4) which are smaller in diameter than the bar stem 72 so as to be inserted in the accommodating part 71a of the rib 71. The coupling parts 72a are extended from both ends of the bar stem 72 by a predetermined length.

At the end of one coupling part 72a is provided a bar head 72b (see FIG. 4) to prevent the spring 73 from coming off the bar stem 72 and helping the bar stem 72 to be easily pressed toward the direction of releasing the hooks 62 from the hook holder 61. Further, at the end of the other coupling part 72a is provided a stopper 72c to prevent the bar stem 72 from coming off the accommodating part 71a of the rib 71. Here, the bar head 72b and the stopper 72c are larger than the bar stem 72 in diameter.

With this configuration, the process of combining the second bracket 40 to the first bracket 30 will be described while referring to FIGS. 4 through 6.

First, the auxiliary memory 45 is accommodated in the second bracket 40. Then, the auxiliary memory 45 is fastened to the second bracket 40 by screwing the bolts 47 into the screw holes 45c through the holes 40c formed on both side plates of the second bracket 40 (see FIG. 2).

Figure 4:
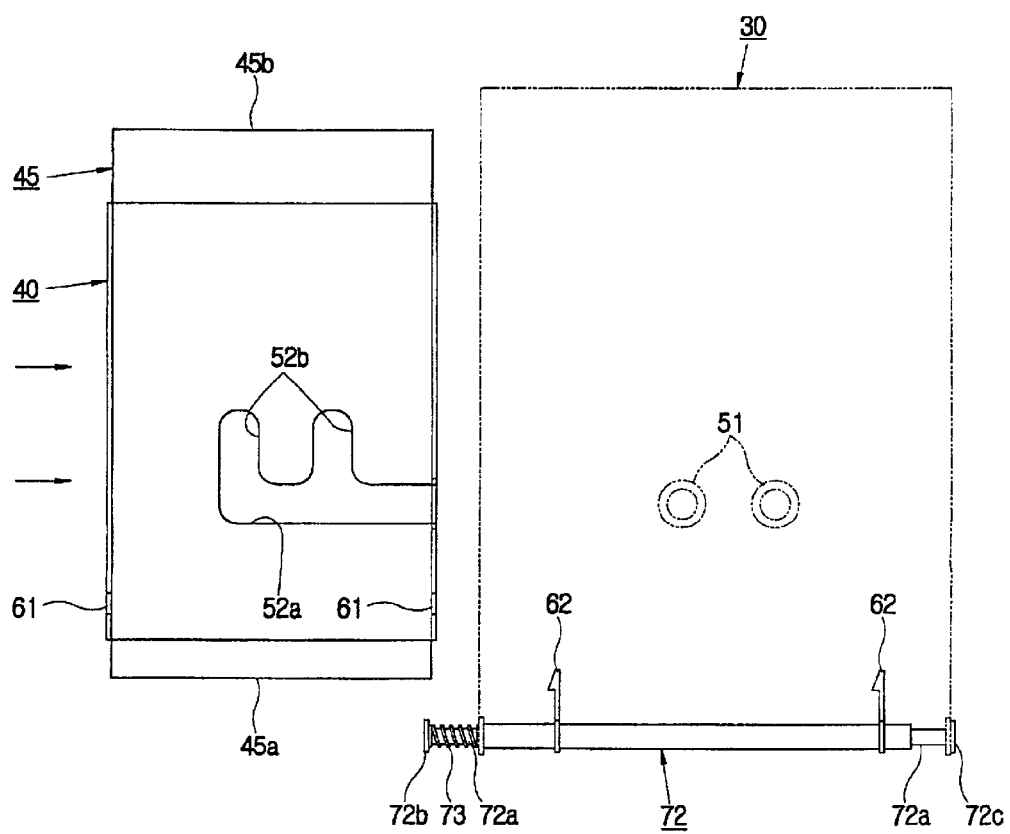
FIGS. 4 through 6 are plan views illustrating the process of combining the second bracket with the first bracket in sequence.

Then, the second bracket 40, accommodating the auxiliary memory 45, is primarily connected to the first bracket 30 by slidingly moving the pair of guiding projections 52 into the first groove 52a (see FIG. 4). When the pair of guiding projections 51 reach an intersection of the first groove 52a and the second grooves 52b (see FIG. 5), the second bracket 40 is slidingly moved toward the front casing 18. At this time, the pair of guiding projections 51 are moved from the first groove 52a to the second grooves 52b.

Accordingly, as the pair of guiding projections 51 almost reach the end of the second grooves 52b, the front end 40a of the second bracket 40 is guided to the slot 18b of the front casing 18, being guided along an inclination of the hooks 62. At this time, contrary to the second bracket 40, the bar stem 72, together with the hooks 62, moves in the opposite direction to the inclination of the hooks 62, namely, toward a right direction of FIG. 6 by a predetermined distance. According to the movement of the bar stem 72, the spring 73 is elastically compressed.

Figure 6:
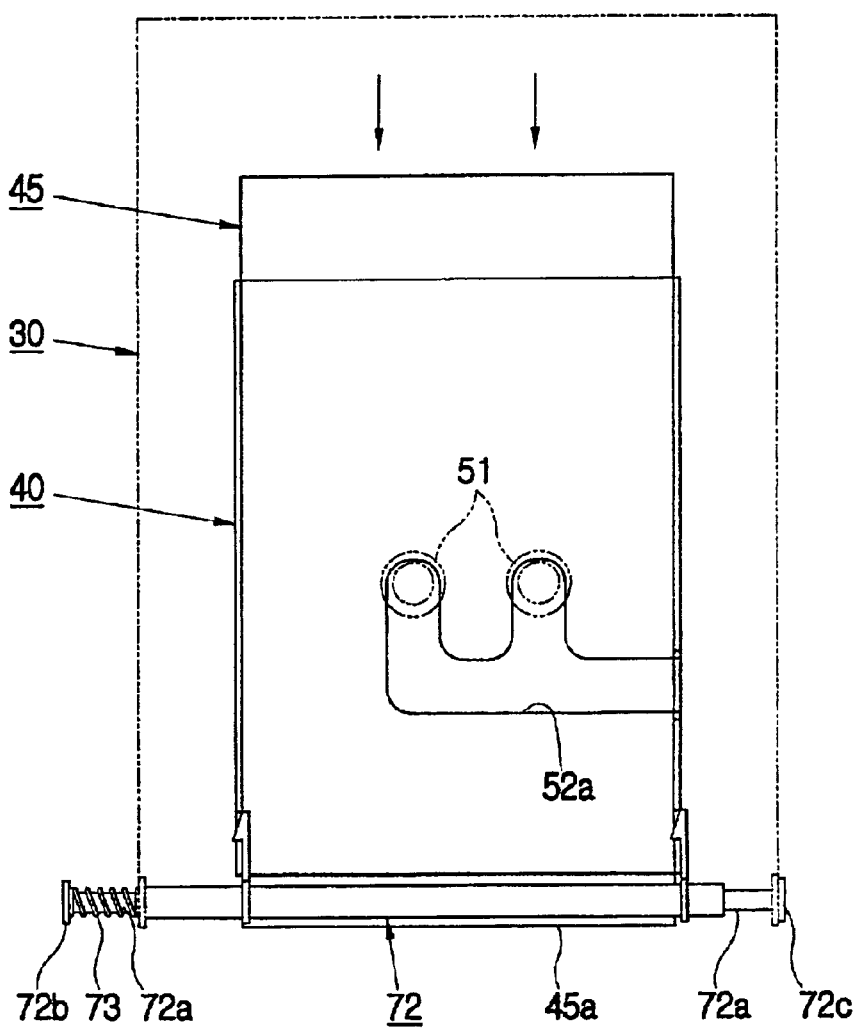

Thereafter, if the pair of guiding projections 51 completely reach the ends of the second grooves 52b, and the front side 45a of the auxiliary memory 45 accommodated in the second bracket 40 reaches the slot 18b of the front casing 18, then the spring 73 is elastically restored, and the bar stem 72, together with the hooks 62, moves in a left direction of FIG. 6, so that the hooks 62 are hooked to the hook holders 61 formed on the second bracket 40. Thus, the second bracket 40 is connected to the lower plate of the first bracket 30.

Conversely, the process of separating the main board 20 from the main casing 10 to repair or change the main board 20 is provided as follows.

Figure 7:
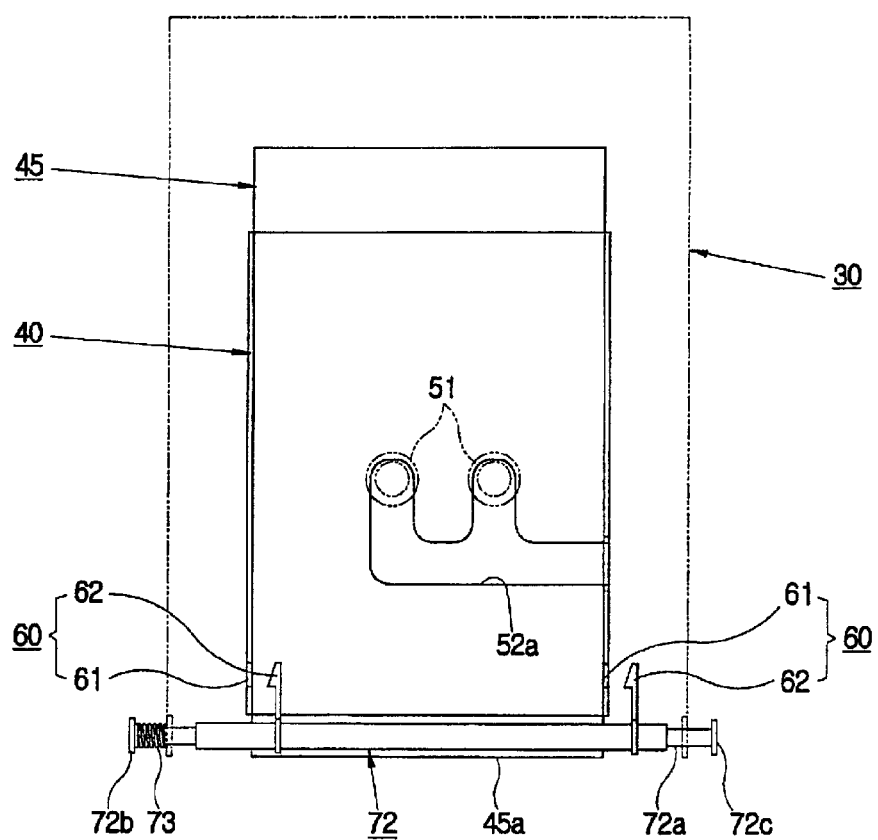
FIG. 7 is a plan view of the second bracket released from the first bracket.

First, the bar head 72b is pressed in a right direction of FIG. 7. Then, the spring 73 is elastically compressed, and the bar stem 72, together with the hooks 62, moves toward the right direction of FIG. 7 by a predetermined distance. At this time, the hooks 62 are released from the hook holders 61 of the second bracket 40.

After the hooks 62 are released from the hook holders 61 by pressing the bar head 72b, the second bracket 40 is moved in the opposite direction from the above connecting direction, and then the pair of projections 51 move out of the second grooves 52b and the first groove 52a in sequence, so that the second bracket 40 is easily released from the first bracket 30.

Figure 5:
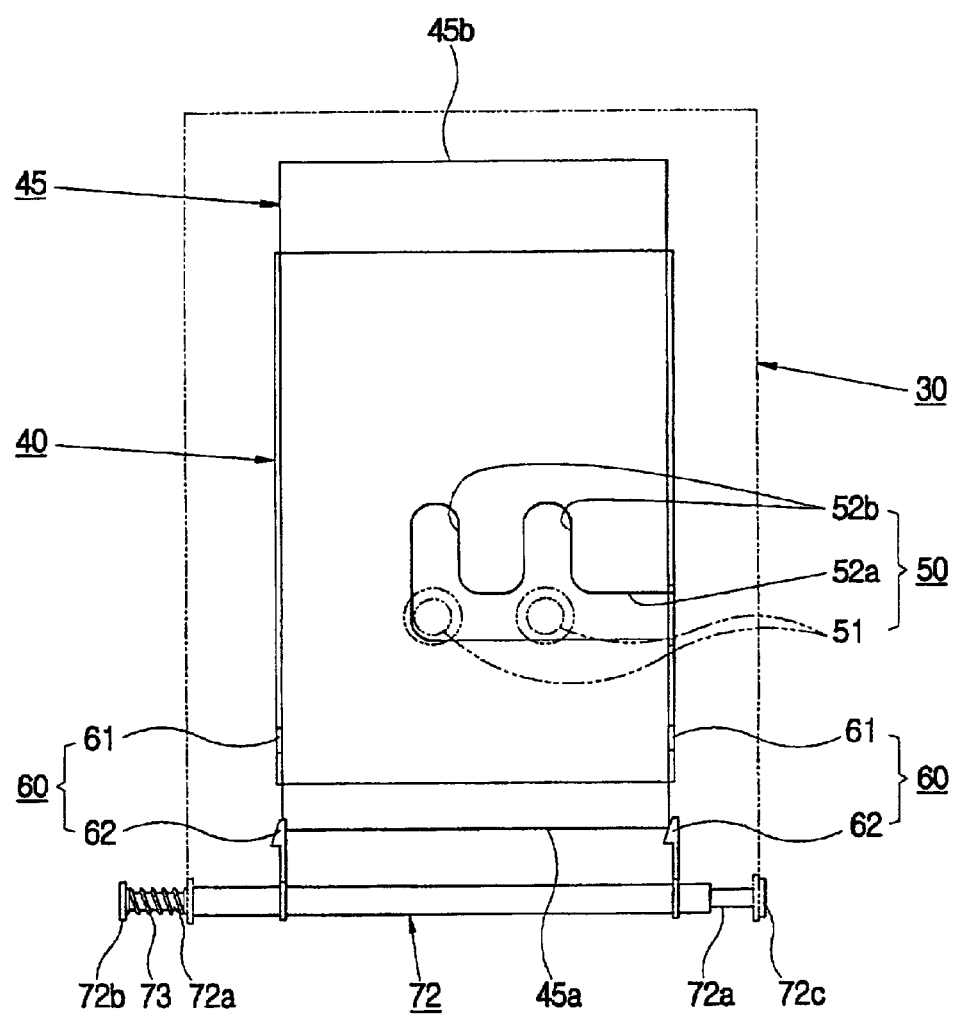

Thus, to repair or change the main board 20, the second bracket 40, accommodating the auxiliary memory 45, is first removed from the first bracket 30, and the main board 20 is repaired or changed, and then the second bracket 40 is, as illustrated in FIGS. 4 through 6, slidingly connected to the first bracket 30.

As described above, in the present embodiment, the second bracket 40 is removably connected to the first bracket 30 by the sliding structure, so that the main casing 10 can be effectively made compact without interference between hardware components therein.

Figure 8:
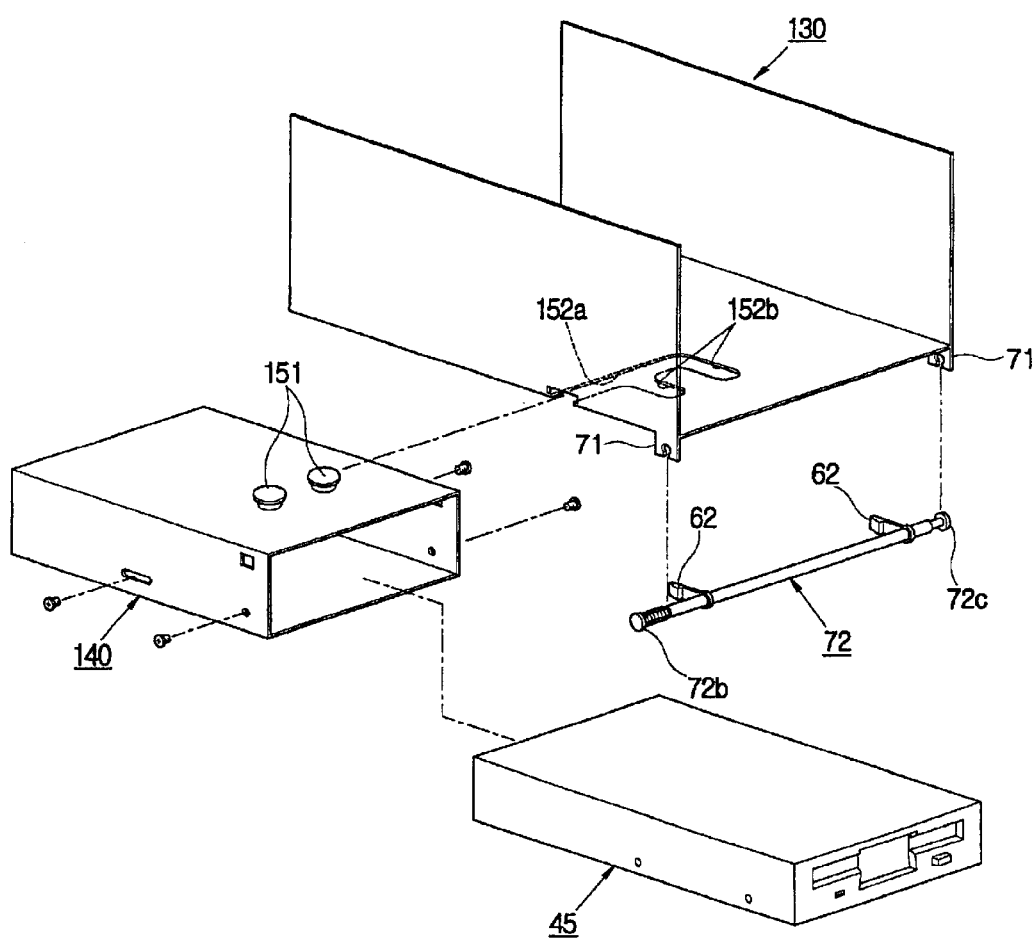
FIG. 8 is an exploded perspective view of first and second brackets and an auxiliary memory in a computer according to another embodiment of the present invention.

In the above embodiment, the guiding projections 51 are provided on the first bracket 30, and the guiding grooves 52a and 52b are provided on the second bracket 40. However, the positions thereof can be changed with respect to each other. That is, as illustrated in FIG. 8, according to another embodiment of the present invention, guiding grooves 152a and 152b are provided on a first bracket 130, and guiding projections 151 are provided on a second bracket 140, but this set up provides the same effect as that of the previous embodiment. Because the configuration illustrated in FIG. 8 is the same as that of the previous embodiment, the repetitive descriptions thereof will be avoided herein.

Figure 9:
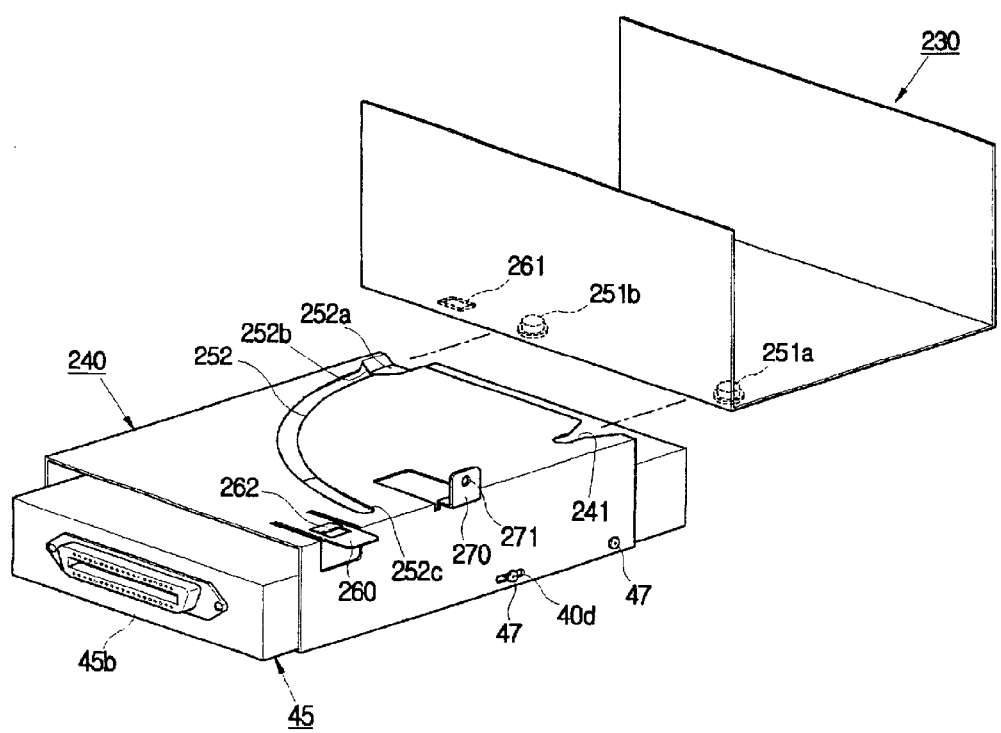
FIG. 9 is an exploded perspective view of first and second brackets and an auxiliary memory in a computer according to yet another embodiment of the present invention
Figure 10:
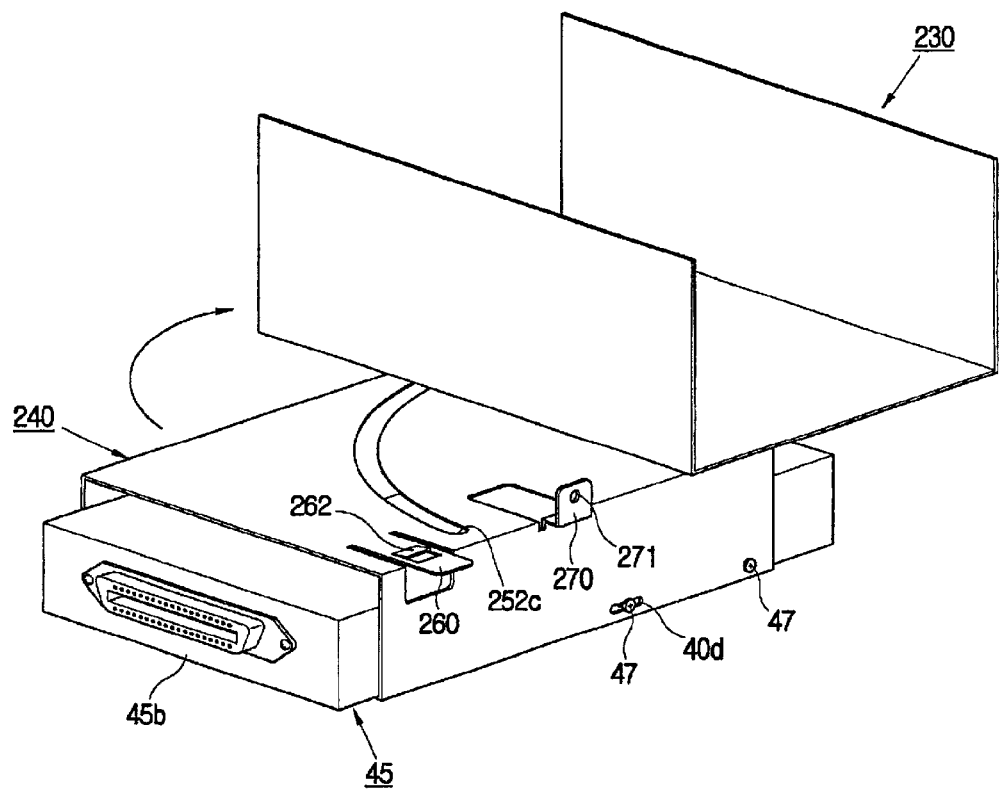
FIG. 10 is a perspective view illustrating an operation of the components in FIG. 9.
Figure 11:
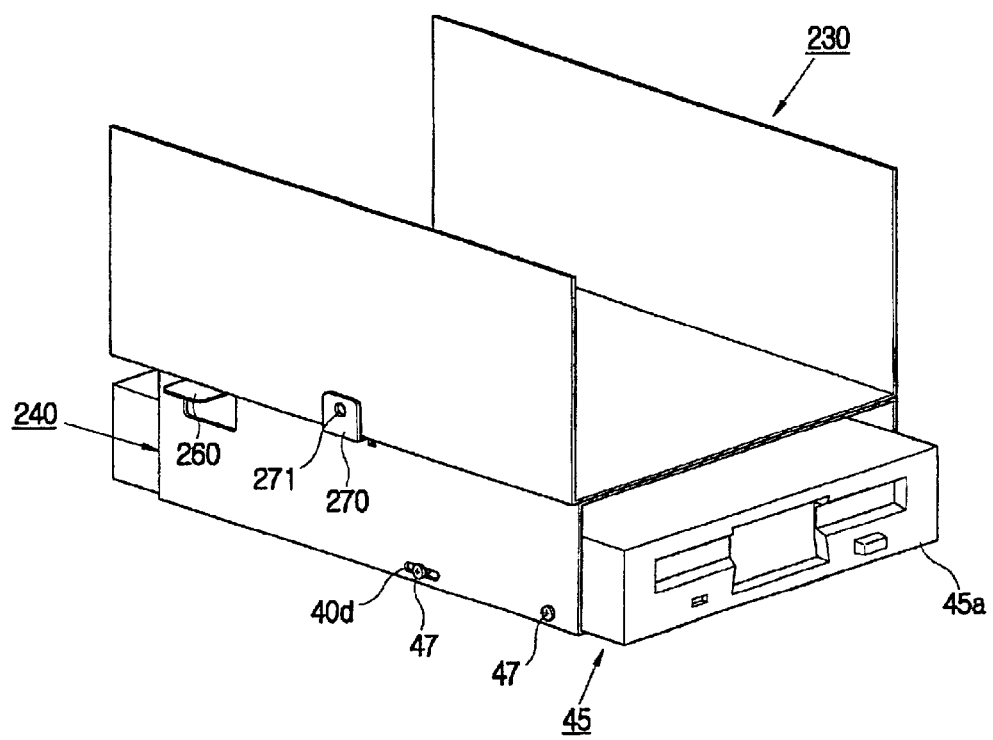
FIG. 11 is a perspective view of the components in FIG. 9 combined together.
Figure 12:
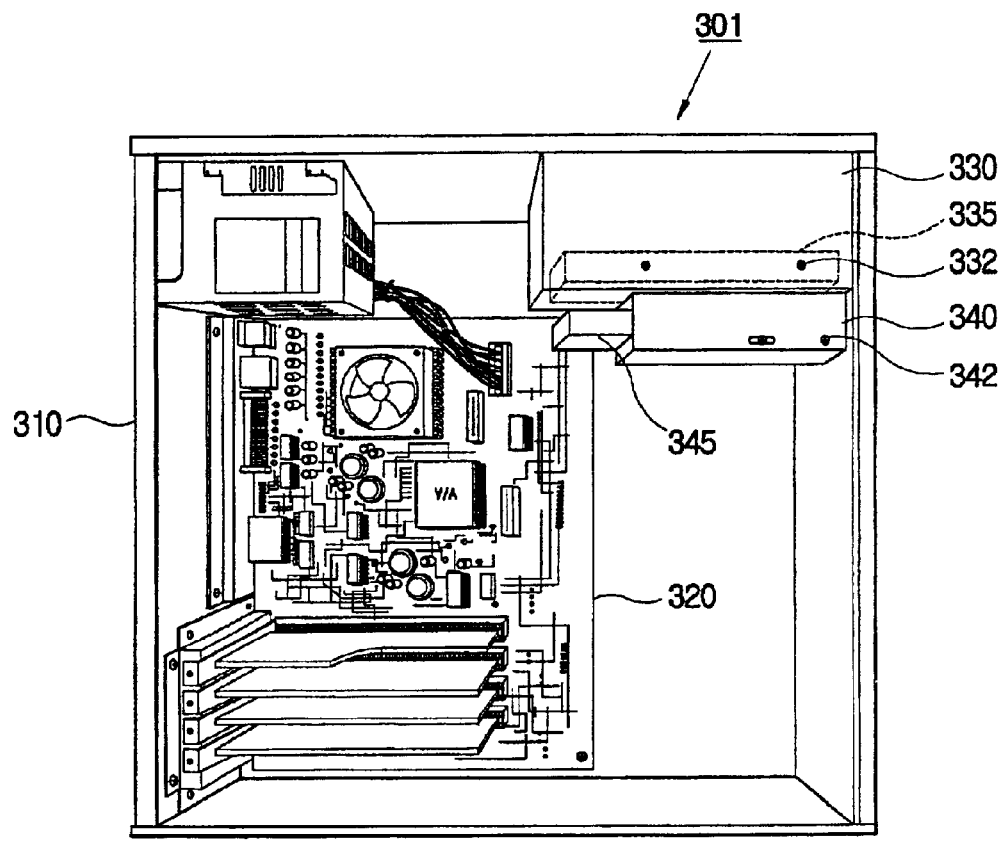
FIG. 12 is a perspective view of a conventional computer casing.

FIGS. 9 through 11 illustrate yet another embodiment of the present invention. As illustrated therein, a first guiding projection 251a and a second guiding projection 251b are provided on the lower plate of the first bracket 230, being spaced from each other, and a first guiding groove 241 and a second guiding groove 252 are provided on the upper plate of the second bracket 240, corresponding to the first guiding projection 251a and the second guiding projection 251b, respectively, which are employed as a sliding part.

The second guiding groove 252 is of an arc shape having a predetermined curvature, and in a first end 252b thereof is provided a stepped part 252a through which the second guiding projection 251b can be easily guided into the second guiding groove 252.

On the upper plate of the second bracket 240 is formed a rib extension part 260 which is made by cutting off a part of the second bracket 240 at a position adjacent to a second end 252c of the second guiding groove 252, and on the rib extension part 260 is provided a hooking rib 262 protruding therefrom. Further, on the first bracket 230 is provided a rib groove 261 to which the hooking rib 262 is hooked.

On the second bracket 240 is provided a rotation stopper 270 perpendicular to the upper plate of the second bracket 240. The rotation stopper 270 is employed not only to stop the second bracket 240 in place when the second bracket 240 is connected to the lower plate of the first bracket 230, but also as a handle when the second bracket 240 is removed from the first bracket 230. Herein, a through hole 271 formed on the stop rib 270 may be employed as a screw hole to fasten the second bracket 240 to the first bracket 230 more firmly.

With this configuration, the process of connecting the second bracket 240 to the first bracket 230 will be described hereinbelow.

As illustrated in FIG. 9, the auxiliary memory 45 is accommodated in the second bracket 240. Then, the first guiding groove 241 is rotatably connected to the first guiding projection 251a, and then the second guiding projection 251b is accommodated in the first end 252b of the second guiding groove 252 through the stepped part 252a. Further, the second bracket 240 is revolved on the first guiding projection 251a of the first bracket 230 in a direction of an arrow provided in FIG. 10. Therefore the second guiding projection 251b is moved from the first end 252b to the second end 252c along the arc of the second guiding groove 252. According to the rotation of the second bracket 240, if the second guiding projection 251b is positioned at the second end 252c of the second guiding groove 252, the hooking rib 262 of the second bracket 240 is hooked on the rib groove 261 of the first bracket 230. Herein, the stop rib 270 contacts a side plate of the first bracket 230, thereby positioning the second bracket 240 in place. Thus, the second bracket 240, accommodating the auxiliary memory 45, is simply connected to the first bracket 240 (see FIG. 11).

Conversely, when the second bracket 240 is removed from the first bracket 230, the stop rib 270 is pulled in the opposite direction from that of the arrow in FIG. 10 when the hooking rib 262 of the second bracket 240 is removed from the rib groove 261 of the first bracket 230.

As described above, according to the present embodiment, the second bracket 240 is removably connected to the first bracket 230 by the rotatable structure so that the main casing 10 can be effectively made compact without interference between hardware components.

In contrast to the previous embodiment, the first guiding projection 251a and the second guiding projection 251b may be provided on the second bracket 240, and the first guiding groove 241 and the second guiding groove 252 may be provided on the first bracket 230. Further, the hooking rib 262 may be provided on the first bracket 230, and the rib groove 261 may be provided on the second bracket 240.

In the above embodiments, the guiding grooves are formed of through holes on the plate of the second or first bracket. Such a hole is suitable for the first or second bracket made of a thin steel plate. However, when the thickness of the first or second bracket is thick, the guiding grooves may comprise rails. In this case, the guiding grooves may be different in shape from those of the above embodiments.

Further, the present invention may be applied to the structure such that the first bracket may be removable from the main casing.

As described above, the present invention provides a computer having a computer casing which is made compact without interference between hardware components thereof.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer comprising:
   a main casing;
   a first bracket mounted on the main casing and accommodating a first peripheral device;
   a second bracket removably connected to the first bracket and accommodating a second peripheral device; and
   a removal protector preventing said second bracket from being voluntarily removed from said first bracket, wherein the removal protector comprises:
   hook holders respectively formed on opposite side plates of said second bracket; and
   hooks respectively formed on opposite sides of said first bracket so as to be hooked to said hook holders.

2. The computer according to claim 1, wherein said first bracket is fixedly mounted on said main casing.

3. The computer according to claim 1, wherein said first bracket is removably mounted on said main casing.

4. The computer according to claim 1, wherein at least one of said first bracket and said second bracket is provided with at least one guiding projection protruding therefrom, and
   the other one of said first bracket and said second bracket is provided with at least one guiding groove to slidingly accommodate said guiding projection.

5. The computer according to claim 4, wherein said at least one guiding projection is formed of a pair of guiding projections spaced from each other by a predetermined distance and are provided on a lower plate of said first bracket, and said guiding groove is provided on an upper plate of said second bracket and accommodates said pair of guiding projections.

6. The computer according to claim 5, wherein said guiding projections are rivets.

7. The computer according to claim 5, wherein said guiding projections are bolts.

8. The computer according to claim 5, wherein said guiding projections are integrally formed on said first bracket.

9. The computer according to claim 5, wherein said guiding groove comprises:
- a first groove parallel with a line that links said pair of guiding projections so as to accommodate said pair of guiding projections; and
- second grooves extending from said first groove and guiding a front side of said second peripheral device to be exposed, said second grooves forming a pair of grooves spaced from each other by a distance corresponding to the distance between said guiding projections and are substantially perpendicular to said first groove.

10. The computer according to claim 1, further comprising a hook releaser to release said hooks from said hook holders.

11. The compute according to claim 10, wherein said hook releaser comprises:
- a pair of ribs extended from both edges of a front end of said first bracket, respectively;
- an accommodating part formed at each rib;
- a bar stem supporting said hooks and movably combined to said accommodating part; and
- a spring disposed between said bar stem and said ribs and elastically restoring said bar stem to a hooking position such that said hooks are hooked to said hooking holders.

12. The computer according to claim 11, wherein at both ends of said bar stem are provided a pair of coupling parts, respectively, which are slimmer than said bar stem so as to be inserted in said accommodating parts of said ribs, respectively.

13. The computer according to claim 11, further comprising a bar head provided at one end of said bar stem to prevent said spring from coming off said bar stem.

14. The computer according to claim 13, further comprising a stopper provided at the other end of said bar stem to prevent said bar stem from coming off said accommodating part of said rib.

15. The computer according to claim 14, wherein said bar head and said stopper are larger than said bar stem in diameter.

16. A computer comprising:
- a main casing;
- a first bracket mounted on the main casing and accommodating a first peripheral device;
- a second bracket removably connected to the first bracket and accommodating a second peripheral device, wherein at least one of said first bracket and said second bracket is provided with a rib extension part having a hooking rib and the other one thereof is provided with a rib groove, and said hooking rib and said rib groove are removably connected to each other;
- a first guiding projection provided on a lower plate of said first bracket; and
- a second guiding projection spaced from said first guiding projection and protruding from the lower plate of said first bracket, wherein said second bracket is provided with first and second guiding grooves to slidingly accommodate respective ones of said first and second guiding projections.

17. A computer comprising:
- a main casing;
- a first bracket mounted on the main casing and accommodating a first peripheral device;
- a second bracket removably connected to the first bracket and accommodating a second peripheral device wherein one of the first bracket and the second bracket is provided with a rib extension part having a hooking rib and the other one thereof is provided with a rib groove, and the hooking rib and the rib groove are removably connected to each other;
- a first guiding projection provided on an upper plate of said second bracket; and
- a second guiding projection spaced from said first guiding projection and protruding from the upper plate of said second bracket, wherein said first bracket is provided with first and second guiding grooves to slidingly accommodate respective ones of said first and second guiding projections.

18. The computer according to claim 16, wherein said second guiding groove has an arc shape.

19. The computer according to claim 17, wherein said second guiding groove has an arc shape.

20. The computer according to claim 18, wherein the first bracket or the second bracket is provided with a rotation stopper limiting rotation of the second bracket by a predetermined angle.

21. The computer according to claim 19, wherein the first bracket or the second bracket is provided with a rotation stopper limiting rotation of the second bracket by a predetermined angle.

22. The computer according to claim 20, wherein the rotation stopper enables the first and second brackets to be connected to each other with a screw so as to reinforce the combination thereof with the screw.

23. The computer according to claim 21, wherein the rotation stopper enables the first and second brackets to be connected with each other with a screw so as to reinforce the combination thereof with the screw.

24. A computer comprising:
- a main casing;
- a first bracket mounted on said main casing to accommodate a first peripheral device;
- a second bracket pivotally connected to said first bracket to accommodate a second peripheral device; and
- a removal protector preventing said second bracket from being voluntarily removed from said first bracket, wherein the removal protector comprises:
  - hook holders respectively formed on opposite side plates of said second bracket; and
  - hooks respectively formed on opposite sides of said first bracket so as to be hooked to said hook holders.

25. The computer according to claim 24, wherein said main casing comprises:
- a main board provided therein.

26. The computer according to claim 25, wherein said second bracket when mounted is in the path of removal of said main board.

* * * * *